June 6, 1950 C. E. STRONG ET AL 2,510,723

RADIO NAVIGATIONAL SYSTEM

Filed Sept. 10, 1945 3 Sheets-Sheet 1

Inventor
CHARLES. ERIC STRONG.
LOUIS JOHN. HEATON-ARMSTRONG

By E. D. Phinney
Attorney

June 6, 1950 C. E. STRONG ET AL 2,510,723

RADIO NAVIGATIONAL SYSTEM

Filed Sept. 10, 1945 3 Sheets-Sheet 2

Inventor
CHARLES ERIC STRONG
LOUIS JOHN HEATON-ARMSTRONG
By [signature]
Attorney June 6, 1950 C. E. STRONG ET AL 2,510,723

RADIO NAVIGATIONAL SYSTEM

Filed Sept. 10, 1945 3 Sheets-Sheet 3

Inventor
CHARLES ERIC STRONG
LOUIS JOHN HEATON-ARMSTRONG
By [signature]
Attorney Patented June 6, 1950 2,510,723

UNITED STATES PATENT OFFICE 2,510,723

RADIO NAVIGATIONAL SYSTEM

Charles Eric Strong and Louis John Heaton-Armstrong, London, England, assignors, by mesne assignments, to International Standard Electric Corporation, New York, N. Y., a corporation of Delaware Application September 10, 1945, Serial No. 615,430
In Great Britain August 18, 1944

4 Claims. (Cl. 343—107)

The present invention relates to radio navigational systems in general, for example, systems for defining an approach path, a glide path, or marker beacons, and it has for its object to provide radio navigational systems in which all the beacons at an aerodrome or airport or marine harbour, for example, and located substantially at the same radiation center as regards a receiver may utilise the same carrier frequency, and further to provide one or more communication channels for speech or other intelligence bearing signal waves between the beacon location and mobile receivers utilising the beacons, also on the same carrier frequency as the beacon transmissions.

According to a broad aspect of the present invention a radio navigational system is characterised in that the radiation from a beacon comprises a series of electrical pulses of constant pulse repetition period.

Such a system enables the same carrier frequency to be employed for all the beacons and any communication channels that may be required at the same location.

According to one feature of the invention, the same pulse repetition frequency may be employed for all the beacons and channels, the pulses of the respective beacons and communication channels, being time phased with respect to each other.

According to another feature of the invention different pulse repetition frequencies may be used for respective channels.

Hereinafter, the various navigational beacons and communication channels will be referred to generally as channels.

In such a system embodying the first mentioned feature of the invention, the channels are arranged to be normally quiescent and are cyclically and successively brought into action by a pulse distributor system much in the same way as a distributor system in a multiplex pulse communication system. A suitable distributor may be, for example, a delay network comprising a four terminal passive transmission network or artificial line which retards the passage of an electrical current propagated therethrough and consists of a plurality of series connected cells made up of electrical impedances. The pulses for rendering the respective channels operative are obtained by tappings at different points along the artificial line.

The mobile receiver for example on the aircraft utilising the channel system is then provided with a distributor which is synchronised to the transmitter distributor and directs the pulses received to their respective receiving apparatus in which they are dealt with according to the functions of the respective channels.

A radio navigational system according to the invention possesses all the advantages of using pulse technique and in addition the beacon channels themselves may be used for communication of speech or other signals, for example call sign transmission by time modulating the pulses of the beacon channels provided that the time duration of a pulse does not exceed the allotted time for the channel. For example the pulses of a channel may be duration modulated or time phase modulated within the limits of the allotted channel period in accordance with the amplitude of the intelligence signal wave. Furthermore when the pulse is transmitted as a short train of carrier waves, the carrier may be frequency or phase modulated in accordance with the amplitude of the intelligence signal wave to be transmitted. Further, amplitude modulation by a signal wave may be imposed upon one or more of the beacon channels. A communication channel proper may be employed for communication of continuous range indications to the aircraft.

The azimuth or approach path beacon and the communication channels have a working range of, for example, 50 miles to aircraft flying at 10,000 feet or over and the glide path beacon has, for example, a range of 10 miles.

The signals of a channel, e. g. a communication channel can be relayed from the aircraft receiver and can be used in known manner by an operator at the ground station for the measurement of the range of the aircraft on the approach path. The range indications can then be transmitted back to the aircraft by a communication channel by telephony or by a method giving direct range reading in the aircraft.

If continuous range is communicated as part of the airport or aerodrome marshalling arrangements then only one marker beacon need be provided, namely the inner marker beacon. When such continuous range communication is not employed an outer marker beacon will also be provided.

It will be observed that in a navigational system embodying the present invention and using the distributor system referred to above, the call sign transmission does not interrupt the approach signals which is a necessary condition in a system designed to remain in operation up to touch down or beyond, and further the indications are displayed in the aircraft which is practically a pre-requisite to automatic flying control. It will further be observed that the receiver main automatic volume control may be operated from an omnidirectional communication channel. Therefore the course beacon can be given a high forward directivity and "fails" or false courses behind the antenna system would be masked.

Any known types of antenna systems may be employed for the respective beacons and may transmit the same or different wave polarisations.

Furthermore, at the receiver suitable antennae for receiving different polarisations, for example horizontal and vertical antennae may be used, the antennae being connected through mixer valves or other separating devices in the radio receiver in accordance with well known technique.

In the case of an approach path beacon by which the path is defined by two overlapping lobes, the lobes may be commutated in dot-dash rhythm about the desired path, or the lobes may be stationary and modulated with different respective distinguishing frequencies.

A beacon system for defining a glide path may be of any known type.

In the case of a system for defining a path by two radio beams arranged to overlap in space, the said path being defined by constant ratio of signal strengths of the signals received from said beams, a single path only is usually necessary and it is then desirable to utilise the greatest amount of the energy radiated from the transmitter for that purpose and to direct the energy into a single directive lobe. When an attempt is made to effect this concentration of power, a plurality of small lobes appear in the radiation distribution diagram in addition to the main lobe directed along the desired direction and these small lobes produce false courses. By good design of the antenna system it is possible to make these unwanted lobes very small and the signals therefrom very weak. However, if the receiver approaches the antenna system from the rear (as regards the main lobes) it will receive these small signals at full strength when not too far from the antenna system on account of the automatic volume control action in the receiver which enables the receiver to attain maximum sensitivity if the signals are weak. Even if the antenna system has no backward radiation false courses could still be obtained by reflection of the radiated waves from objects falling within the main radiation lobes. This reflection would be weak but quite strong enough to be picked up by a receiver as sensitive as would be required to receive the main radiation at the maximum distance.

In order to eliminate these false courses, it has been proposed to transmit an omni-directional supplementary radiation which is received by the mobile receiver and utilised to control the gain of said receiver as regards reception of the main radiation as to reduce said gain when the field strength at the receiver of the supplementary radiation exceeds a predetermined value.

In such a system embodying the present invention, the supplementary omni-directional radiation consists of a pulse modulated transmission. Further the main transmission producing the overlapping lobes to define the desired path may also be pulse modulated.

The omni-directional supplementary radiation may be utilised as a communication channel, for example, for telephone communication in accordance with known pulse modulation technique, between the ground station and the mobile receiver.

The invention will be further described in the following description of some embodiments thereof and taken in conjunction with the accompanying drawings in which Figure 1 illustrates in block schematic form the transmitting beacons of a radio navigational system.

Figures 1, 4, 6:
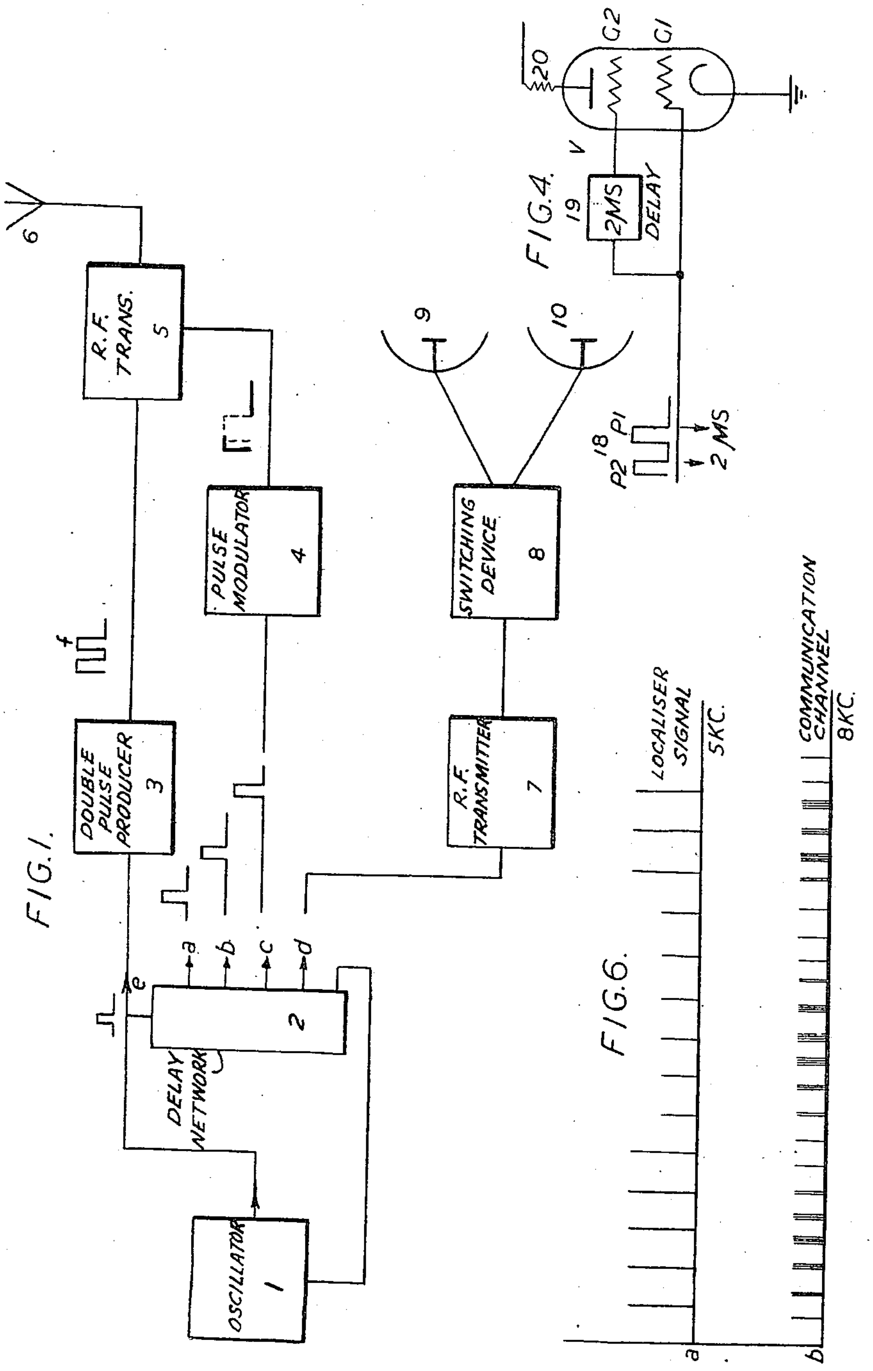
Figure 4 shows a detail unit of Figure 3.
Figure 6 is an explanatory diagram used in the description of Figure 5.

Referring now to Figure 1, it will be assumed that all the channels (i. e. beacons and communication channels) are transmitted on the same carrier frequency and that all channels have the same pulse repetition frequency, the pulses for the respective channels being time phased with respect to each other.

In Figure 1 block 1 represents a square wave generator producing pulses of rectangular wave form at a repetition rate of 8000 per sec. and of duration about 2 μs. These pulses are fed to a passive delay network represented by block 2 having a large number of sections and having a total delay of 125 μs. The output of the network 2 is fed back to 1 to stabilise the pulse frequency. Four outputs from network 2 *a*, *b*, *c*, *d* are shown, these outputs will be in the form of 2 μs. pulses, *b* being 25 μs. behind the input pulse at *a*, *c* 50 μs. behind *a* and the pulses corresponding to respective other channels following at 25 μs. intervals, so that pulses for channel *d* are 75 μs. behind *a*. The output from 1 is also fed by path *e* to a device which converts each pulse into two pulses to distinguish the pulse train in the path from the remaining pulse trains at the receiver. The double pulse shown at *f* is used as the synchronising pulse at the receiver for synchronising the receiver distributor to the transmitter distributor. The channel pulse train from tapping *c* of the network 2 is shown as being used for the communication channel and will be duration modulated by known arrangements indicated by block 4 the leading edge remaining unaffected by the modulation.

Figures 2, 5:
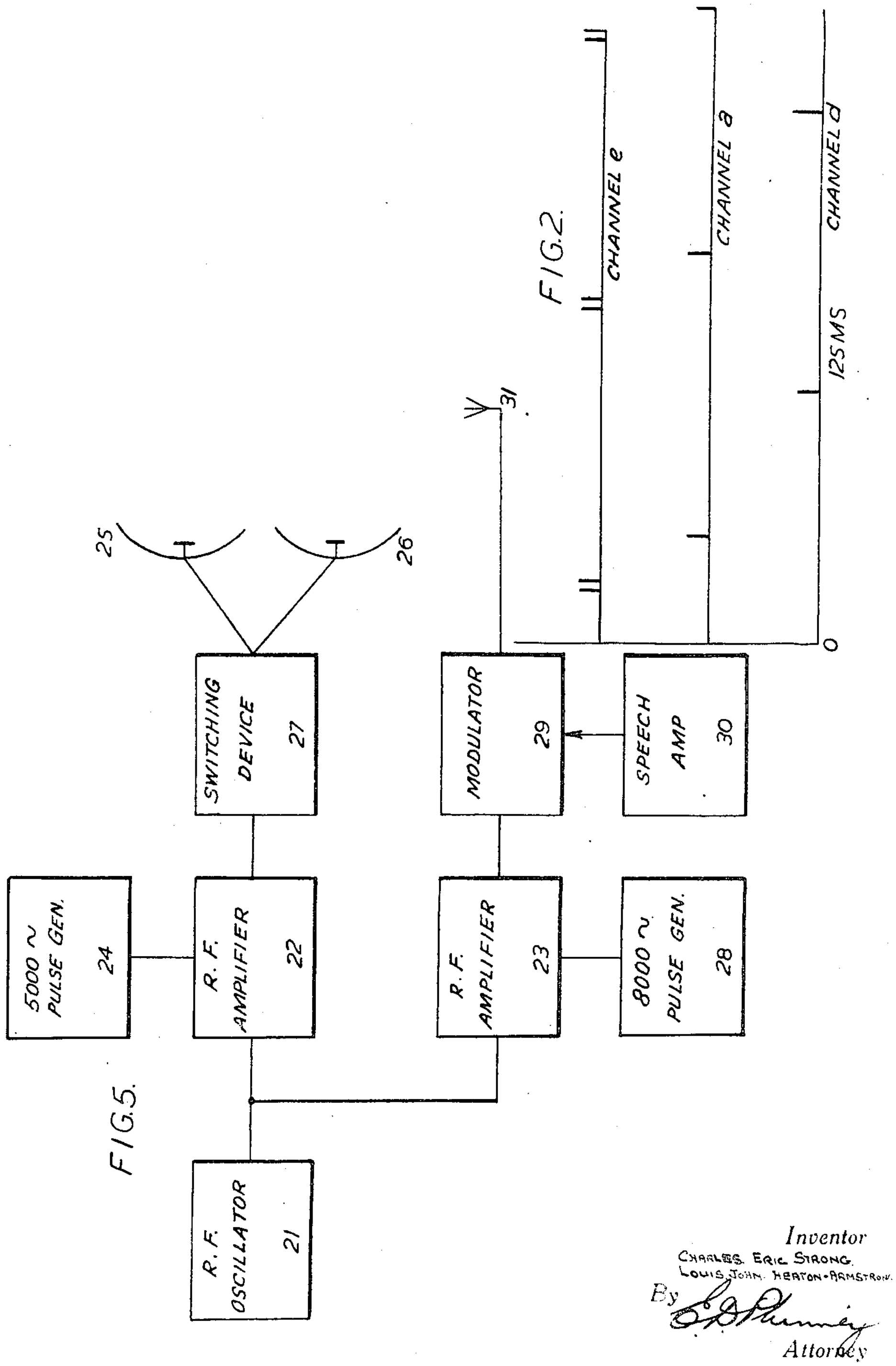
Figure 2 is an explanatory diagram used in the description of Figure 1.
Figure 5 shows in block schematic form another form of transmitting beacon system.

The modulated pulse is then fed to the transmitter represented by block 5 where it modulates the carrier wave which is radiated by the aerial 6 which may be an omni-directional one. The other channels are used as required. For instance the pulses of channel *d* are shown modulating an R. F. transmitter represented by block 7 so that the transmitter produces pulses at 8000 P. P. S. repetition frequency. These pulses from 7 are shown in Fig. 2 and designated channel *d*. This pulse train then passes through a known switching device represented by block 8 and is applied alternately to directive antennae 9 and 10 in a dot dash rhythm, for example, to produce an approach course by overlapping field patterns.

At the receiver the pulses are received as a train of pulses and amplified and appear as D. C. pulses at the output of the main receiver represented by block 11.

The double synchronising pulse is selected by an arrangement represented by block 12 and produces a single pulse, as will be described in relation to Figure 4. This pulse is used to control a pulse generator represented by block 13, e. g. a multivibrator the output of which, after shaping if necessary, is fed to a passive delay network distributor represented by block 14 from which, as in the transmitter selector pulses are obtained at tapping points *a*, *b*, *c* and *d* spaced 25 μs. apart; pulse *a* will be 23 μs. behind the original synchronising pulse at the output of receiver 1 and is used in known manner to make the gating circuit represented by block 15 sensitive 2 μs. before channel *a* pulse arrives at the gating circuit. Selector pulse *a* maintains 15 sensitive until the received pulse of channel *a* has passed through and then closes the gate. The pulses of channel *a* passing through the gate 15 are fed to a pulse detector circuit represented by block 16 and are used to obtain the necessary information derived from signal modulations applied at modulator 4, Fig. 1.

In a similar manner the other channels *b*, *c* and *d* are selected by similar gate circuits. Automatic volume control is obtained either from the synchronising pulse selector output from 12 as shown or from the output of the communication channel and after amplification in amplifier represented by block 17 is used to maintain the receiver sensitivity suitable for receiving the desired beacons. It will be seen that if the craft flies at the rear of the approach course beacon where the signal for the approach course will be very weak that the sensitivity will not depend on the approach course signals but on the pulses radiated from the omni-directional antenna 6 of Fig. 1 and any signals from the approach course antennae will be so weak as to be ineffective or inaudible. It is only when the craft is in the approach sector that the approach signals will be effective or heard and in this sector there will be no false courses.

Figures 3, 7:
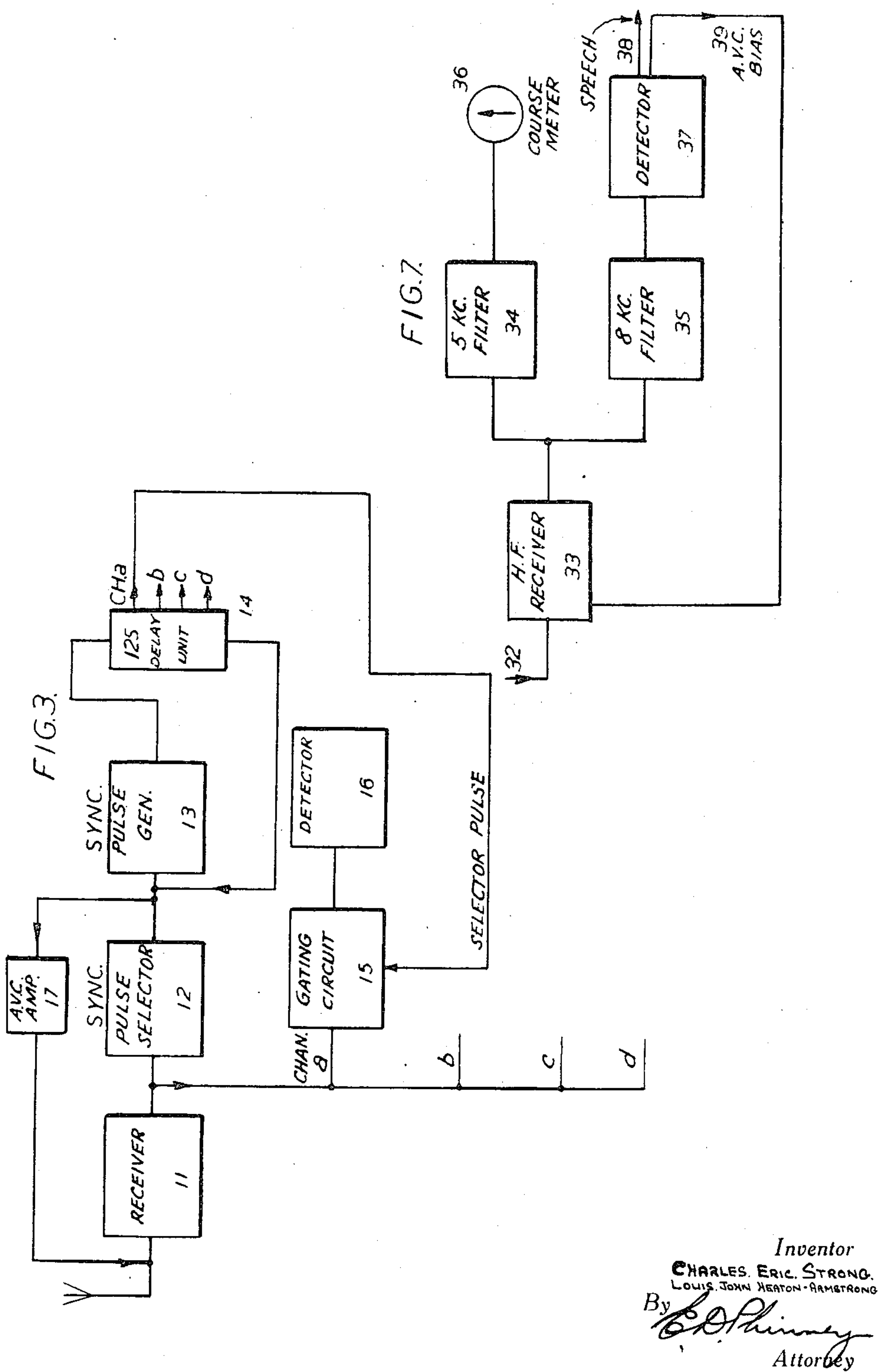
Figure 3 illustrates in block schematic form a receiver for use with the beacons as shown in Figure 1.
Figure 7 shows in block schematic form a receiver for use with the beacons as shown in Figure 5.

Figure 4 shows one form of circuit which the pulse selector 12, Figure 3 may take. The double synchronising pulse is indicated at 18, there being two microseconds between the two pulses. The first pulse P1 drives the grid G1 of an amplifier valve V positive, but grid G2 remains at negative potential for 2 microseconds produced by a delay device represented by block 19. The pulse P1 then drives G2 positive, but at this instant grid G1 is also positive due to the second pulse P2, so that the valve V conducts and a pulse is produced which may be obtained from a resistance 20 in the anode circuit, or alternatively in the cathode circuit of V.

In Figure 5 block 21 represents a radio frequency oscillator the output of which is fed to a radio frequency amplifier represented by block 22, and a radio frequency amplifier represented by block 23. A pulse generator of pulses of rectangular wave form and of frequency 5000 pulses per second is represented by block 24, and feeds into the amplifier and modulator 22 the pulse modulated output of which is fed to aerials 25 and 26 through the switching device 27 which feeds pulse energy to the aerials alternately for example in a dot-dash rhythm. The switching device may be electronic, for example utilising gating circuits opened by pulses of rectangular wave form complementary or reversed with respect to each other. Such devices are well known and further details are not considered necessary. Alternatively, the switching device 27 may be mechanical.

The radio frequency from 21 applied to amplifier and modulator 23 is pulse modulated at a pulse repetition frequency of 8000 pulses per second of rectangular wave form supplied from the generator represented by block 28. The pulse modulated carrier frequency output from 23 is fed to modulator represented by block 29 in which it is amplitude modulated by, for example a speech wave from source represented by block 30. Alternatively the speech wave may be employed to time modulate the pulses generated by 28 in any known manner in the art of time modulated pulses. These time modulated pulses—time phased or duration modulated, are then applied to modulate the radio frequency from 21 applied to 23. In any event the speech modulated pulse carrier wave from 23 or 29 is fed to energise the omni-directional aerial 31 to provide the communication channel.

Figure 7 shows schematically a receiving circuit for use with the beacon system of Figure 5.

In Figure 7 the receiver aerial is indicated by 32 and feeds a radio frequency receiver of known form represented by block 33, the output of which consists of D. C. pulses at 8,000 and 5,000 pulses per second and the pulses being approximately of 2 microseconds duration. These two trains are separated by means of filters represented respectively by blocks 34 and 35. The output of 34 is represented in curve *a*, Figure 6, which shows the pulses of unequal amplitude during the dot and dash periods, that is when the receiver is off the course defined by the overlapping patterns of aerials 25 and 26, Figure 5. The output of 34 is applied to a course meter 36 of the form usually employed in approach path systems which define the desired paths or course by overlapping radiation patterns.

The output from filter 35 at 8,000 pulses per second is applied to detector or demodulator circuit represented by block 37. This demodulator will be of any known type suited to the type of modulation employed. The speech wave is obtained in the output 38 and fed to a suitable form of translation device. Curve *b*, Figure 6, shows the pulse output pulses of 35 as duration modulated.

As in the case of the receiver shown in Figure 3 automatic volume control voltages are obtained from the output of detector 37 which is obtained from the omni-directional radiation of the beacon arrangement of Figure 5 and the control voltages are applied by conductor 39 to control the receiver gain which is therefore adjusted according to the strength of this omni-directional signal. As described in relation to Figures 1 to 4 false courses are eliminated by obtaining the automatic volume control voltages from the omnidirectional signal.

Since the pulse repetition frequency is of the order of 8,000 pulses per second and the pulse duration is two micro-seconds, the pulses are only on for $^{16}/_{1000}$ of the time and since the repetition frequencies of the two radiations are different the times during which the two sets of pulses coincide is negligible, and no question of interference due to using the same carrier frequency for both transmissions arises. The aerials for the two transmissions, i. e., the approach path aerials and the omni-directional aerial, can, therefore, be placed in the most convenient position for each.

It will be understood that all the items represented by blocks in the accompanying drawings are well known and any suitable type which will fulfill the desired function of the item may be employed.

Also while reference has been made particularly to complementary signal type of system it will be understood that the invention is equally applicable to other systems defining a path for a mobile radio receiver by two overlapping radiation patterns, for example, systems in which the radiation patterns are constantly radiated, i. e. not commutated, but are distinguished by distinctive modulations.

Further, particular reference has been made to navigational systems for use by aircraft by way of example only but it will be understood that such systems can be used equally well for use with other mobile receivers, for example receivers carried by marine craft.

What is claimed is:

1. A radio navigational system having a plurality of radiating means including a beacon radiator and an omnidirectional radiator, means for supplying each of said radiating means with radiant energy pulses, including pulse generating means, and delay means for delaying said pulses to distribute them to different output channels, including a communication channel for transmitting intelligence signals, means for shaping pulses applied to said omnidirectional radiator to provide synchronizing pulses, means for applying the energy from said communication channel to said omnidirectional radiator, and means for applying energy from another of said channels to said beacon radiator.

2. A radio navigational system as claimed in claim 1, wherein each channel is provided with a gating circuit for the control thereof to which pulses from said delay means are respectively applied, whereby the pulse energy is permitted to pass to the channels.

3. A radio navigational system as claimed in claim 1, further comprising a receiver unit, a distributor system at said receiver unit having means responsive to said synchronizing signals, said distributor system serving to direct the pulses received to respective receiving apparatus according to the functions of the respective channels.

4. A radio navigational system according to claim 3, further comprising automatic volume control means at said receiver and means for deriving automatic volume control voltage from pulses received from said omnidirectional radiator.

CHARLES ERIC STRONG.
LOUIS JOHN HEATON-ARMSTRONG.

REFERENCES CITED

The following references are of record in the file of this patent:

UNITED STATES PATENTS

| Number | Name | Date |
|---|---|---|
| 2,199,634 | Koch | May 7, 1940 |
| 2,262,838 | Deloraine et al. | Nov. 18, 1941 |
| 2,266,401 | Reeves | Dec. 16, 1941 |
| 2,372,620 | Williams | Mar. 27, 1945 |
| 2,400,127 | McGuigan | May 14, 1946 |
| 2,403,600 | Holmes et al. | July 9, 1946 |
| 2,403,626 | Wolff | July 9 1946 |
| 2,407,199 | Wolff | Sept. 3, 1946 |
| 2,433,381 | Marchand | Dec. 30, 1947 |